United States Patent
Kim et al.

(10) Patent No.: US 10,505,606 B2
(45) Date of Patent: Dec. 10, 2019

(54) HYBRID BEAMFORMING-BASED BROADCAST CHANNEL TRANSMITTING METHOD AND DEVICE IN WIRELESS CONNECTION SYSTEM

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 178 days.

(21) Appl. No.: 15/502,974

(22) PCT Filed: Aug. 11, 2015

(86) PCT No.: PCT/KR2015/008391
§ 371 (c)(1),
(2) Date: Feb. 9, 2017

(87) PCT Pub. No.: WO2016/024788
PCT Pub. Date: Feb. 18, 2016

(65) Prior Publication Data
US 2017/0237476 A1    Aug. 17, 2017

Related U.S. Application Data

(60) Provisional application No. 62/036,054, filed on Aug. 11, 2014.

(51) Int. Cl.
*H04B 7/06* (2006.01)
*H04L 5/00* (2006.01)
*H04W 72/04* (2009.01)

(52) U.S. Cl.
CPC .......... *H04B 7/0617* (2013.01); *H04B 7/0619* (2013.01); *H04L 5/0048* (2013.01); *H04L 5/0053* (2013.01); *H04W 72/046* (2013.01)

(58) Field of Classification Search
None
See application file for complete search history.

(56) References Cited

U.S. PATENT DOCUMENTS 6,885,862 B1 *   4/2005  Pearson  ................  H04W 8/245
                                                             455/418
2013/0223251 A1 *  8/2013  Li  ........................  H04W 72/046
                                                             370/252

(Continued)

FOREIGN PATENT DOCUMENTS

KR    1020130029745     3/2013
KR    1020130119882    11/2013

(Continued)

OTHER PUBLICATIONS

Juergen Carstens et al.; titled "Dynamic Hotspot Management with RET Antennas for UMTS Core and Extension Bands", presented in ip.com Journal: vol. 4 Issue 7 (Jul. 25, 2004), and is the product of Siemens AG 2004, Germany (Year: 2004).*

(Continued)

*Primary Examiner* — Ayaz R Sheikh
*Assistant Examiner* — Tarell A Hampton
(74) *Attorney, Agent, or Firm* — Lee Hong Degerman Kang Waimey

(57) ABSTRACT

The present invention provides a hybrid beamforming-based broadcast channel transmitting method and devices. In an embodiment of the present invention, a method for transmitting broadcast channels in a wireless connection system supporting hybrid beamforming includes: a step of transmitting N broadcast channels including the same broadcast information in N mutually different subframes; and a step of (Continued)

receiving feedback information on one or more of the N broadcast channels, wherein N mutually different analog beams may be applied to the N broadcast channels, and N may be a positive integer.

4 Claims, 12 Drawing Sheets

(56) References Cited

U.S. PATENT DOCUMENTS

2013/0301454 A1* 11/2013 Seol ........................ H04B 7/043
                                                        370/252
2014/0003262 A1*  1/2014 He ........................ H04W 28/08
                                                        370/252

FOREIGN PATENT DOCUMENTS

| KR | 1020130127376 | 11/2013 |
| KR | 1020140043532 | 4/2014 |
| WO | 2013133645 | 9/2013 |

OTHER PUBLICATIONS

PCT International Application No. PCT/KR2015/008391, Written Opinion of the International Searching Authority dated Nov. 27, 2015, 19 pages.

* cited by examiner

HYBRID BEAMFORMING-BASED BROADCAST CHANNEL TRANSMITTING METHOD AND DEVICE IN WIRELESS CONNECTION SYSTEM

CROSS-REFERENCE TO RELATED APPLICATIONS

This application is the National Stage filing under 35 U.S.C. 371 of International Application No. PCT/KR2015/008391, filed on Aug. 11, 2015, which claims the benefit of U.S. Provisional Application No. 62/036,054, filed on Aug. 11, 2014, the contents of which are hereby incorporated by reference herein in their entirety.

TECHNICAL FIELD

The present invention relates to a radio access system and, more particularly, to a method and apparatus for transmitting a hybrid beamforming-based broadcast channel

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

A hybrid beamformer basically operates by a combination of analog beamforming and digital beamforming. At this time, since transmission regions of an analog beam and a digital beam are restricted to specific regions, multi-rank support and multiuser support are restricted. In particular, in a hybrid beamformer, due to restriction on the transmission range of an analog beam, it is difficult to simultaneously transmit a broadcast channel (or a broadcast signal) to a plurality of user equipments (UEs).

The present invention provides various methods for solving such a problem.

An object of the present invention is to provide a coarse analog beam acquisition or sectorization method through broadcast channel detection.

Another object of the present invention is to provide a method of transmitting a broadcast channel for a flexible cell or a flexible sector.

Another object of the present invention is to provide a method applicable to a hybrid beamforming method and a digital beamforming method.

Another object of the present invention is to provide an antenna structure for supporting hybrid beamforming supporting such methods.

Another object of the present invention devised to solve the problem lies in apparatuses for supporting such methods.

The technical problems solved by the present invention are not limited to the above technical problems and other technical problems which are not described herein will become apparent to those skilled in the art from the following description.

TECHNICAL SOLUTION

The present invention provides methods and apparatuses for transmitting a hybrid beamforming-based broadcast channel As aspect of the present invention, a method of transmitting a broadcast channel in a radio access system supporting hybrid beamforming includes transmitting N broadcast channels including same broadcast information in N different subframes and receiving feedback information for one or more of the N broadcast channels. N different analog beams are applied to the N broadcast channels and N is a positive integer.

Another aspect of the present invention, an apparatus for transmitting a broadcast channel in a radio access system supporting hybrid beamforming includes a transmitter, a receiver, and a processor configured to control the transmitter and the receiver to support transmission of the broadcast channel At this time, the processor may be configured to transmit N broadcast channels including same broadcast information in N different subframes through the transmitter and to receive feedback information for one or more of the N broadcast channels through the receiver. At this time, N different analog beams are applied to the N broadcast channels and N is a positive integer.

The N analog beams may be configured in a hierarchical structure in which coverage of beams each having a smaller width is included in coverage of a beam having a larger width.

The feedback information may include one or more indices of analog beams applied to the broadcast channels or one or more indices of subframes in which the broadcast channels are transmitted.

The feedback information may further include information on reference signal receive power (RSRP) of the broadcast channels.

The feedback information may further include information on a gain difference between a reference signal receive power (RSRP) of a reference beam and a reference signal receive power (RSRP) of the analog beam.

The aspects of the present invention are only a part of the preferred embodiments of the present invention, and various embodiments based on technical features of the present invention may be devised and understood by the person having ordinary skill in the art based on the detailed description of the present invention.

Advantageous Effects

As is apparent from the above description, the embodiments of the present invention have the following effects.

First, by acquiring a coarse analog beam or performing sectorization through broadcast channel detection, it is possible to apply hybrid beamforming suitable for each user equipment (UE) upon transmitting a subsequent broadcast channel or data.

Second, a base station (eNB) can configure and apply a flexible cell or a flexible sector based on information fed back from a UE. At this time, the feedback information may include information on a detected analog beam, information on a subframe, information on a hierarchical structure of an analog beam, RSRP information, etc.

Third, the methods proposed in the embodiments of the present invention are applicable not only to a hybrid beamforming method but also to a digital beamforming method.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
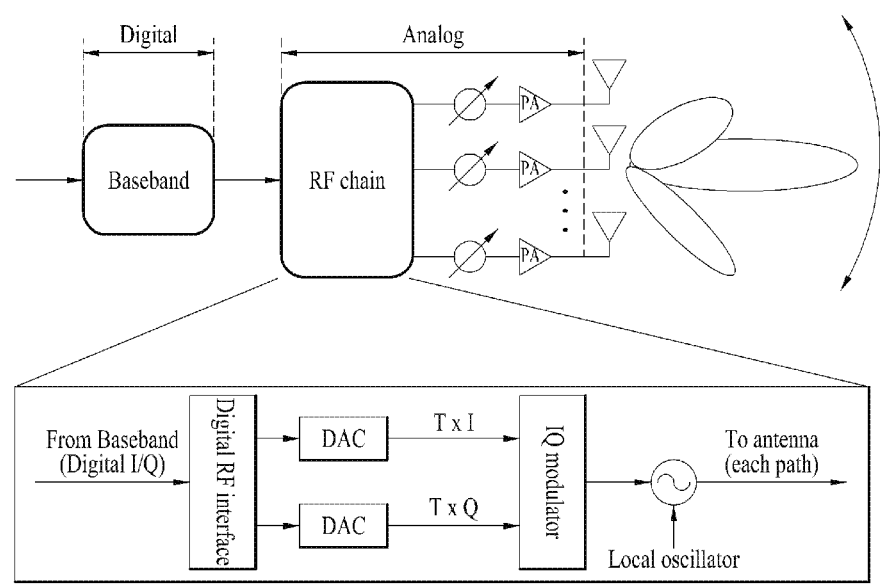
FIG. 1 is a block diagram showing a transmitter including an analog beamformer and a radio frequency (RF) chain.

The below-described embodiments of the present invention relate to a method and apparatus for transmitting a hybrid beamforming-based broadcast channel in a radio access system.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical idea and scope of the present disclosure.

Hereinafter, 3GPP LTE/LTE-A system which is one of examples of wireless access systems which are used in the embodiments of the present invention.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16 e/m system, etc.

1. Hybrid Beamforming 1.1 Analog Beamforming Technology and Digital Beamforming Technology Existing beamforming technology using multiple antennas may be roughly divided into analog beamforming technology and digital beamforming technology according to location, to which a beamforming weight vector/precoding vector is applied.

FIG. 1 is a block diagram showing a transmitter including an analog beamformer and a radio frequency (RF) chain.

First, the analog beamforming method is a representative beamforming method applied to an initial multi-antenna structure, which divides an analog signal subjected to digital signal processing into a plurality of paths and performs beamforming through a phase shifter (PS) and a power amplifier (PA) of each path. As shown in FIG. 1, for analog beamforming, an analog signal derived from a single digital signal needs to be processed by a PA and a PS connected to each antenna. That is, in an analog stage, a complex weight is processed by the PS and the PA. Here, a radio frequency (RF) chain means a processing block for converting a baseband (BB) signal into an analog signal and the configuration thereof is shown in FIG. 2.

In the analog beamforming method, beamforming accuracy is determined according to device characteristics of the PS and the PA. In addition, the analog beamforming method is suitable for narrowband transmission due to control characteristics of the devices. In contrast, due to a hardware structure in which it is difficult to implement multiple stream transmission, multiplexing gain for increasing a transfer rate is relatively low. In addition, it is difficult to perform beamforming per user based on orthogonal resource assignment.

Figure 2:
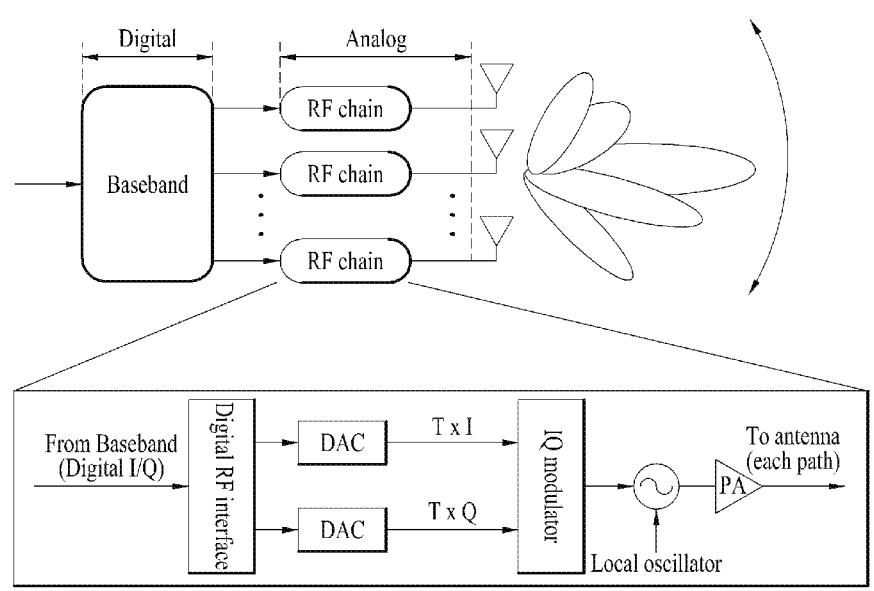
FIG. 2 is a block diagram showing a transmitter including a digital beamformer and a radio frequency (RF) chain.

FIG. 2 is a block diagram showing a transmitter including a digital beamformer and a radio frequency (RF) chain.

In digital beamforming, unlike analog beamforming, a transmitter performs beamforming in a digital stage using a BB process in order to maximize diversity and multiplexing gain in a multiple input multiple output (MIMO) environment. For example, as shown in FIG. 2, precoding is performed in a BB process such that beamforming is possible (here, an RF chain includes a PA), because a complex weight derived for beamforming is directly applied to transmitted data.

In addition, in the digital beamforming method, since beamforming may be differently performed per user, it is possible to support simultaneous beamforming for multiple users. Since beamforming is independently performed per user, to which orthogonal resources are assigned, scheduling flexibility is high and a transmission end suiting a system purpose can be employed. In addition, if MIMO-orthogonal frequency division multiplexing (OFDM) technology is applied in a broadband transmission environment, it is possible to form an independent beam per subcarrier. Accordingly, the digital beamforming method can optimize a maximum single user transfer rate based on enhanced beam gain and system capacity enhancement. Therefore, in a current 3G/4G system, digital beamforming based MIMO technology has been introduced.

Next, a massive MIMO environment in which the number of transmit/receive antennas is significantly increased will be described.

In general, in cellular communication, assume that a maximum number of transmit/receive antennas applied to the MIMO environment is 8. However, as massive MIMO has evolved, the number of antennas may be increased to several tens of antennas or several hundred antennas. If digital beamforming technology is applied in the massive MIMO environment, since signal processing for several hundreds of antennas for digital signal processing of a transmission end is performed through a BB process, signal processing complexity is significantly increased. In addition, since RF chains corresponding in number to the number of antennas are required, hardware implementation complexity is significantly increased.

In addition, since independent channel estimation of all antennas is required and feedback information of a massive MIMO channel including all antennas is required in a frequency division duplex (FDD) system, pilot and feedback overhead are significantly increased. In contrast, if analog beamforming technology is applied in the massive MIMO environment, hardware complexity of a transmission end is relatively low, but performance increase due to use of multiple antennas is insignificant and resource assignment flexibility is lowered. In particular, it is difficult to control a beam per frequency upon broadband transmission.

Accordingly, in the massive MIMO environment, instead of exclusively selecting only one of the analog beamforming method and the digital beamforming method, a method of configuring a hybrid transmission end which is a combination of an analog beamforming structure and a digital beamforming structure is necessary. That is, as shown in Table 1 below, using a relationship between performance gain and complexity of an analog beamforming method and a digital beamforming method, a hybrid transmission end capable of decreasing hardware implementation complexity thereof and maximizing beamforming gain using a massive antenna array needs to be designed.

TABLE 1

|  | Beamforming accuracy control ease | Multi-carrier beam control | Multi-stream transmission | Hardware complexity (BB process) | Pilot and feedback overhead |
| --- | --- | --- | --- | --- | --- |
| Analog beamforming method | low (relationship PA/PS device characteristics) | Impossible or difficult | Impossible or difficult | Low | Low |
| Digital beamforming method | high | Possible | Possible | High | High |

1.2 Hybrid Beamforming

The purpose of hybrid beamforming is to configure a transmission end having merits of an analog beamforming method and a digital beamforming method while decreasing hardware complexity in a massive MIMO environment.

Figure 3:
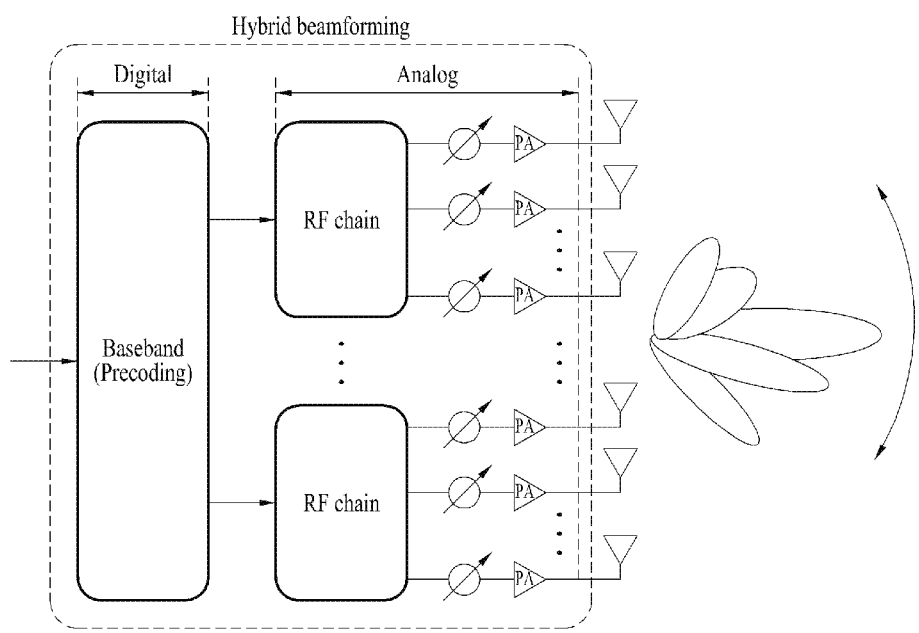
FIG. 3 is a block diagram showing a transmission end including a hybrid beamformer.

FIG. 3 is a block diagram showing a transmission end including a hybrid beamformer.

As shown in FIG. 3, a hybrid beamforming method may be configured to perform coarse beamforming using an analog beamforming method and to perform multi-stream or multi-user transmission using a digital beamforming method.

As a result, a hybrid beamforming method is obtained by simultaneously utilizing the analog beamforming method and the digital beamforming method in order to decrease implementation complexity or hardware complexity of the transmission end. Fundamentally, technical issues of the hybrid beamforming method will now be described.

(1) Difficulty in Optimization of Analog/Digital Beamforming Design

Optimization simultaneously considering analog beamforming and digital beamforming has the following difficulties. Fundamentally, a beamforming method is independently applicable per user using the same time-frequency resources in digital beamforming but a common beamforming method should be applied using the same time-frequency resources in analog beamforming. Accordingly, this restricts optimization of the number of supportable ranks, beam control flexibility and beamforming resolution.

For example, there are problems such as 1) maximum rank restriction according to the number of RF chains, 2) difficulty in subband beam control by RF beamformer and 3) beam resolution/granularity segmentation problems.

(2) Necessity of Embodying Common Signal Transmission Method

In the analog beamforming method for forming a beam only in a specific direction using the same time-frequency resources, it is impossible to simultaneously form a plurality of beams in all UE directions. Accordingly, common signals such as an uplink/downlink control channel, a reference signal (RS), a broadcast channel, a synchronous signal, etc. cannot be simultaneously transmitted to all UEs distributed in an entire area of a cell. In addition, problems may be caused in transmission of an uplink RACH channel, a sounding reference signal, a physical uplink control channel (PUCCH), etc.

(3) Necessity for Additional Pilot and Feedback Design for Analog/Digital Beamforming If analog/digital beam estimation is performed, a digital beam may use an existing orthogonal pilot assignment scheme without change but an analog beam requires a predetermined time-duration corresponding to the number of beam candidates. This means that time delay for analog beam estimation is large and complexity is significantly increased when an analog beam is estimated simultaneously with a digital beam.

For example, system loss may be caused due to increase in time delay for analog beam estimation and beam estimation complexity may be increased due to increase in combinations of analog and digital beams.

(4) Difficulty in Supporting Analog Beam Based SDMA and FDMA

In the digital beamforming method, beamforming for multi-user/stream is freely performed. However, in the analog beamforming method, since the same beamforming is performed with respect to an entire transmission band, it is difficult to independently perform beamforming per user or per stream. In particular, since it is difficult to support FDMA via orthogonal frequency resource assignment, it is difficult to optimize frequency resource efficiency.

For example, it may be difficult to support orthogonal frequency division multiple access (OFDMA) for supporting multiple access due to difficulty in independent beamforming per user in the frequency domain at the same time and to support single user-MIMO (SU-MIMO) for supporting multiple streams due to difficulty in independent beamforming per stream at the same frequency-time. In addition, it may be difficult to support multi user-MIMO (MU-MIMO) for supporting multiple users due to difficulty in independent beamforming per user at the same frequency-time In order to solve such technical issues, the embodiments of the present invention provide methods for solving analog/digital beam estimation complexity for hybrid beamforming.

1.3 Hybrid Beamforming System model

Figure 4:
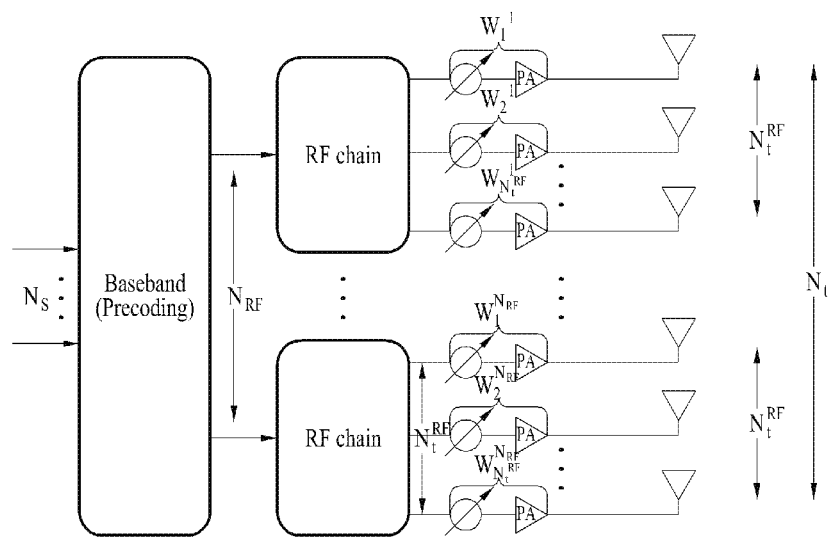
FIG. 4 is a diagram showing an example of the structure of a hybrid beamformer configured in a basic transmission end.

FIG. 4 is a diagram showing an example of the structure of a hybrid beamformer configured in a basic transmission end.

As shown in FIG. 4, a transmission end structure including only $N_t^{RF}$ independent antennas per RF chain may be assumed. Accordingly, a relationship between the total number of antennas and the number of antennas per RF chain is $N_t = N_t^{RF} \times N_{RF}$. Finally, since a signal passing through a phase shifter (PS) and a power amplifier (PA) per RF chain is independently sent to a transmit antenna, a matrix type system model shown in Equation 1 below may be derived.

$$y_k = H_k F_k^{RF} F_k^{BB} s_k + z_k \quad \text{[Equation 1]}$$

In Equation 1, $y_k$ denotes a received signal vector $N_r \times 1$ at a k-th subcarrier, $H_k$ denotes an $N_r \times N_t$ channel of the k-th subcarrier, $F^{RF}$ denotes an $N_t \times N_t$ RF precoder equally configured in all subcarriers, and $F_k^{BB}$ denotes an $N_{RF} \times N_S$ baseband precoder at the k-th subcarrier, which is changeable according to subcarrier. In addition, $s_k$ denotes a transmitted signal vector $N_S \times 1$ at the k-th subcarrier and $z_k$ denotes a noise signal vector $N_r \times 1$ at the k-th subcarrier.

At this time, k denotes a subcarrier index (k=0,1,2, ..., $N_{FFT}$−1), $N_{FFT}$ denotes the total number of subcarriers as a Fast Fourier Transform (TTF) size and $N_{RF}$ denotes the total number of RF chains.

In addition, $N_t$ denotes the total number of antennas of the transmission end, $N_t^{RF}$ denotes the number of transmit antennas included per RF chain, $N_r$ denotes the total number of antennas of the reception end, and $N_s$ denotes the number of streams of transmitted data.

At this time, Equation 2 below may be obtained by solving Equation 1 with respect to a subcarrier k.

$$\begin{bmatrix} y^{(1)} \\ \vdots \\ y^{(Nr)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix}$$

$$F^{RF}\left(\begin{bmatrix} v_{1,1} & v_{1,2} & \cdots & v_{N_{RF},N_s} \\ v_{2,1} & v_{2,2} & \cdots & v_{N_{RF},N_s} \\ \vdots & \vdots & \ddots & \vdots \\ v_{N_{RF},1} & v_{N_{RF},2} & \cdots & v_{N_{RF},N_s} \end{bmatrix} \begin{bmatrix} x^{(1)} \\ \vdots \\ x^{(N_s-1)} \end{bmatrix}\right) +$$

$$\begin{bmatrix} z^{(1)} \\ \vdots \\ z^{(Nr)} \end{bmatrix}$$

[Equation 2]

In Equation 2, an analog beamforming equivalent precoding matrix $F^{RF}$ ($N_t \times N_{RF}$ matrix) obtained by a phase shifter and PA for changing the phase of a beam after an RF chain may be defined as shown in Equation 3 below.

$$F^{RF} = \begin{bmatrix} w^1_{N_t^{RF}} & 0 & 0 & \cdots & 0 \\ 0 & w^2_{N_t^{RF}} & 0 & \cdots & 0 \\ 0 & 0 & w^3_{N_t^{RF}} & \cdots & 0 \\ \vdots & \vdots & \vdots & \ddots & \vdots \\ 0 & 0 & 0 & \cdots & w^{N_{RF}}_{N_t^{RF}} \end{bmatrix}$$

[Equation 3]

In addition, a precoding weight per RF chain of the RF precoding matrix $F^{RF}$ may be defined as shown in Equation 4 below.

$$w^i_{N_t^{RF}} = \begin{bmatrix} w^i_1 \\ w^i_2 \\ \vdots \\ w^i_{N_t^{RF}} \end{bmatrix}$$

[Equation 4]

1.4 Beam Radiation Pattern of Hybrid Beamformer (BF) for Uniform Linear Array (ULA) Antenna

Figure 5:
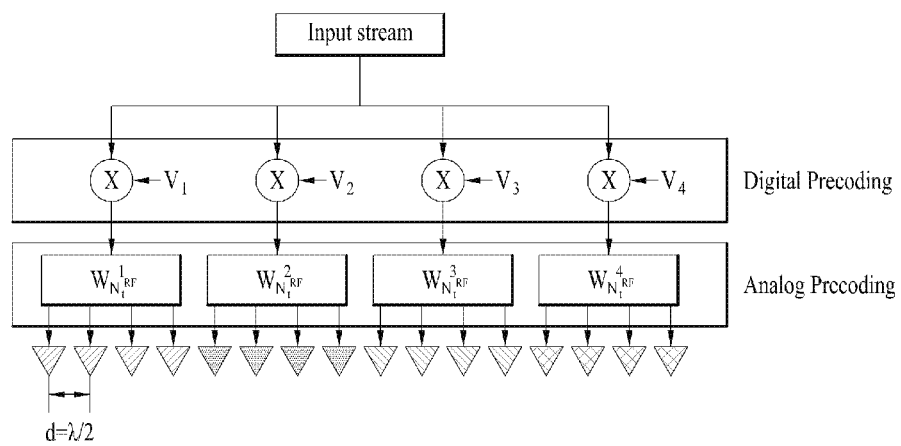
FIG. 5 is a diagram showing a 16-ULA antenna structure including four RF chains.

FIG. 5 is a diagram showing a 16-ULA antenna structure including four RF chains.

An array response vector of a ULA antenna may be defined as shown in Equation 5 below.

$$a(\theta) = \left[1 \; \exp\left(j2\pi \times 1 \times \frac{d}{\lambda}\sin(\theta)\right) \exp\left(j2\pi \times 2 \times \frac{d}{\lambda}\sin(\theta)\right)\right.$$
$$\left. \cdots \exp\left(j2\pi \times (N_t - 1) \times \frac{d}{\lambda}\sin(\theta)\right)\right]^T$$

[Equation 5]

where, $\lambda$ denotes a wavelength and d denotes a distance between antennas. In order to indicate the antenna radiation pattern of the hybrid beamformer, for convenience, assume that the number of RF chains is 4 and the number of analog antennas per RF chain is 4. Such a beamformer is shown in FIG. 5. At this time, the total number of transmit antennas is 16 and the distance between antennas is $d=\lambda/2$.

At this time, the PS and the PA of the analog terminal may be represented by an equivalent beamforming weight and may be defined as shown in Equation 6 below.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix},$$

[Equation 6]

$$w^i_{N_t^{RF}} = \begin{bmatrix} w^i_1 \\ w^i_2 \\ w^i_3 \\ w^i_4 \end{bmatrix}$$

At this time, an arbitrary rank-1 weight vector applied in a digital beamforming stage may be defined as shown in Equation 7 below.

$$F^{BB} = v_1 = [v_1 \; v_2 \; v_3 \; v_4]^T$$

[Equation 7]

An antenna array response vector, to which analog beamforming of Equation 6 and digital beamforming of Equation 7 are applied, may be expressed by Equation 8 below. At this time, assume that the distance between the antennas is $d=\lambda/2$. Each antenna array response vector may be expressed by a sum of all vector elements.

$$\sum a(\theta) = \sum_{i=0}^{15} a_i(\theta) =$$

$$(1 \cdot w^1_1 + \exp(j\pi \times \sin(\theta)) \cdot w^2_1 + \exp(j\pi 2 \times \sin(\theta)) \cdot w^3_1 +$$
$$\exp(j\pi 3 \times \sin(\theta)) \cdot w^4_1) \times v_1 +$$
$$(\exp(j\pi 4 \times \sin(\theta)) \cdot w^1_2 + \exp(j\pi 5 \times \sin(\theta)) \cdot w^2_2 +$$
$$\exp(j\pi 6 \times \sin(\theta)) \cdot w^3_2 + \exp(j\pi 7 \times \sin(\theta)) \cdot w^4_2) \times$$
$$v_2 + (\exp(j\pi 8 \times \sin(\theta)) \cdot w^1_3 + \exp(j\pi 9 \times \sin(\theta)) \cdot w^2_3 +$$
$$\exp(j\pi 10 \times \sin(\theta)) \cdot w^3_3 + \exp(j\pi 11 \times \sin(\theta)) \cdot w^4_3) \times$$
$$v_3 + (\exp(j\pi 12 \times \sin(\theta)) \cdot w^1_4 + \exp(j\pi 13 \times \sin(\theta)) \cdot w^2_4 +$$
$$\exp(j\pi 14 \times \sin(\theta)) \cdot w^3_4 +$$
$$\exp(j\pi 15 \times \sin(\theta)) \cdot w^4_4) \times v_4$$

[Equation 8]

At this time, an analog beamforming weight may be set as shown in Equation 9 below. This is an analog beamforming weight setting method which is generally applied in order to set boresight through analog beamforming.

$$w^1_1 = \begin{bmatrix} 1 \\ e^{-j\pi \sin(\phi)} \\ e^{-j\pi 2 \sin(\phi)} \\ e^{-j\pi 3 \sin(\phi)} \end{bmatrix},$$

$$w^1_2 = \begin{bmatrix} e^{-j\pi 4 \sin(\phi)} \\ e^{-j\pi 5 \sin(\phi)} \\ e^{-j\pi 6 \sin(\phi)} \\ e^{-j\pi 7 \sin(\phi)} \end{bmatrix} = e^{j\pi 4 \sin(\phi)} \begin{bmatrix} 1 \\ e^{-j\pi \sin(\phi)} \\ e^{-j\pi 2 \sin(\phi)} \\ e^{-j\pi 3 \sin(\phi)} \end{bmatrix},$$

[Equation 9]

-continued $$w_3^1 = \begin{bmatrix} e^{-j\pi 8 sin(\phi)} \\ e^{-j\pi 9 sin(\phi)} \\ e^{-j\pi 10 sin(\phi)} \\ e^{-j\pi 11 sin(\phi)} \end{bmatrix} = e^{j\pi 8 sin(\theta)} \begin{bmatrix} 1 \\ e^{-j\pi sin(\phi)} \\ e^{-j\pi 2 sin(\phi)} \\ e^{-j\pi 3 sin(\phi)} \end{bmatrix},$$

$$w_4^1 = \begin{bmatrix} e^{-j\pi 12 sin(\phi)} \\ e^{-j\pi 13 sin(\phi)} \\ e^{-j\pi 14 sin(\phi)} \\ e^{-j\pi 15 sin(\phi)} \end{bmatrix} = e^{j\pi 12 sin(\theta)} \begin{bmatrix} 1 \\ e^{-j\pi sin(\phi)} \\ e^{-j\pi 2 sin(\phi)} \\ e^{-j\pi 3 sin(\phi)} \end{bmatrix}$$

If Equation 8 is simplified using Equation 9, Equation 10 below can be obtained.

$$\Sigma a(\theta)=(1+\exp(j\pi[\sin(\theta)-\sin(\phi)])+\exp(j\pi 2[\sin(\theta)-\sin(\phi)])+\exp(j\pi 3[\sin(\theta)-\sin(\phi)]))\times(v_1+\exp(j\pi 4[\sin(\theta)-\sin(\phi)])\cdot v_2+\exp(j\pi 8[\sin(\theta)-\sin(\phi)])\cdot v_3+\exp(j\pi 12[\sin(\theta)-\sin(\phi)])\cdot v_4)$$ [Equation 10]

Equation 11 below is obtained by generalizing Equation 10.

$$\sum a(\theta) = (1 + \exp(j\pi[\sin(\theta) - \sin(\phi)]) + \ldots + \exp(j\pi(N_t^{RF} - 1) \cdot [\sin(\theta) - \sin(\phi)])) \times$$
$$(v_1 + \exp(j\pi \cdot (N_t^{RF}) \cdot [\sin(\theta) - \sin(\phi)]) \cdot$$
$$v_2 + \ldots + \exp(j\pi \cdot (N_t^{RF} \cdot (N_{RF} - 1)] \cdot$$
$$[\sin(\theta) - \sin(\phi)]) \cdot v_{N_{RF}})$$
$$= \left(\sum_{i=1}^{N_t^{RF}} s_i\right) \times \left(\sum_{i=1}^{N_{RF}} t_i\right) = \sum s \times \sum t$$ [Equation 11]

where, $\phi$ denotes a degree for determining analog beamforming. For example, if $\phi=30°$ or $\pi/6$ is set, a beamforming direction having maximum beam gain at $\theta=30°$ or $\pi/6$ is set.

Figure 6:
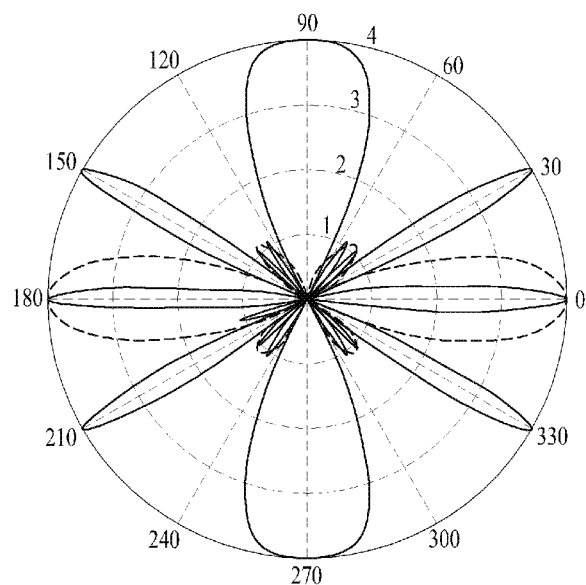
FIG. 6 is a diagram showing an example of a beam pattern of a beam bound vector and a beam steering vector.
Figure 7:
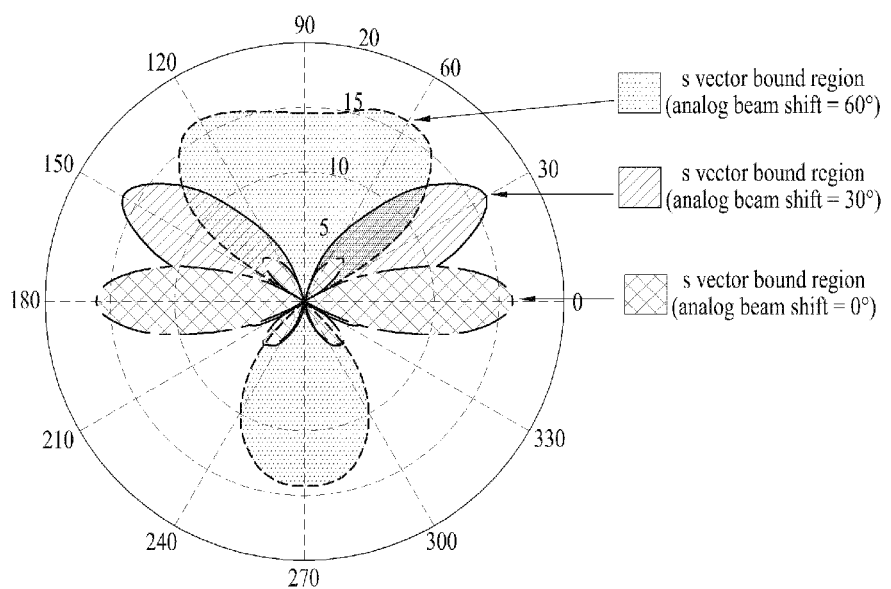
FIG. 7 is a diagram showing a final antenna array response according to analog beam shift.

In addition, a beam bound vector S determines an entire valid range and a digital beamforming range is restricted to a corresponding region. FIG. 6 is a diagram showing an example of a beam pattern of a beam bound vector and a beam steering vector. FIG. 7 is a diagram showing a final antenna array response according to analog beam shift.

Referring to FIG. 6, the beam bound vector s is denoted by a dotted line and beam gain and a beam steering vector t are denoted by a solid line. Finally, a cumulative beam pattern result of applying all vectors $v_1=[v_1 \; v_2 \; v_3 \; v_4]^T$ for determining digital beamforming is shown in FIG. 7. That is, it can be seen that a valid beam range is restricted to the beam bound vector s.

1.5 Digital Beam Coefficient Setting Method Considering Analog Beam Coefficient

As described above, a beam pattern of hybrid beamforming is represented by the total number $N_{RF}$ of RF chains and the number $N_t^{RF}$ of analog antennas per RF chain as shown in Equation 11. Here, the weight vector of a digital beamforming coefficient has a length of $1 \times N_{RF}$. Here, a final beam direction is a combination of an analog beam weight and a digital beam weight. Problems which may occur upon applying digital beamforming without pre-compensating for analog beamforming will now be described. In addition, hereinafter, for convenience of description, a description will be given based on Equation 10 ($N_t=16$, $N_t^{RF}=4$, $N_{RF}=4$). At this time, the digital beamforming weight $v=[v_1 \; v_2 \; v_3 \; v_4]^T$ of Equation 10 may be designed as shown in Equation12 below.

$$v = \begin{bmatrix} v_1 \\ v_2 \\ v_3 \\ v_4 \end{bmatrix} = \begin{bmatrix} 1 \\ e^{-j\pi 4 sin(\psi)} \\ e^{-j\pi 8 sin(\psi)} \\ e^{-j\pi 12 sin(\psi)} \end{bmatrix}$$ [Equation 12]

Equation 13 below may be obtained by generalizing Equation 12.

$$v = \begin{bmatrix} v_1 \\ v_2 \\ \vdots \\ v_{N_{RF}} \end{bmatrix} = \begin{bmatrix} 1 \\ e^{-j\pi \cdot N_t^{RF} \cdot 1 \cdot sin(\psi)} \\ \vdots \\ e^{-j\pi \cdot N_t^{RF} \cdot (N_{RF}-1) sin(\psi)} \end{bmatrix}$$ [Equation 13]

In Equation 12 and 13, a final array response vector considering a digital beamforming angle $\psi$ may be defined as shown in Equation 14 below.

$$\Sigma a(\theta)=(1+\exp(j\pi[\sin(\theta)-\sin(\phi)])+\exp(j\pi 2[\sin(\theta)-\sin(\phi)])+\exp(j\pi 3[\sin(\theta)-\sin(\phi)]))\times\{(1+\exp(j\pi 4[\sin(\theta)-\sin(\phi)-\sin(\psi)])+\exp(j\pi 8 [\sin(\theta)-\sin(\phi)-\sin(\psi)])+\exp(j\pi 12[\sin(\theta)-\sin(\phi)-\sin(\psi)])\}$$ [Equation 14]

In Equation 14, $[\sin(\theta)-\sin(\phi)-\sin(\psi)]$ between brackets determines a final beamforming angle. That is, by adjusting $\sin(\phi)$ through analog beamforming and controlling $\sin(\psi)$ through digital beamforming, $\sin(\theta)$ having maximum beam gain is finally adjusted. At this time, if boresight is set to $\phi=30°$ through analog beamforming and $\psi=5°$ is set through digital beamforming for fine tuning, Equation 14 is finally changed to Equation 15.

$$\Sigma a(\theta)=(1+\exp(j\pi[\sin(\theta)-\sin(30°)])+\exp(j\pi 2[\sin(\theta)-\sin(30°)])+\exp(j\pi 3[\sin(\theta)-\sin(30°)]))\times(1+\exp(j\pi 4[\sin(\theta)-\sin(30°)-\sin(5°)])+\exp(j\pi 8[\sin(\theta)-\sin(30°)-\sin(5°)])+\exp(j\pi 12[\sin(\theta)-\sin(30°)-\sin(5°)]))$$ [Equation 15]

As a result, an angle having maximum beam gain is $\theta$ satisfying $\sin(\theta)-\sin(30°)-\sin(5°)=0$. That is, in beamforming, assume that the beam may be finally shifted by 35° shifting the beam by 30° through analog beamforming and shifting the beam by 5° through digital beamforming. However, $\theta$ satisfying $\sin(\theta)-\sin(30°)-\sin(5°)=0$ is not accurately 35°. That is, a relationship of $\theta \approx \phi+\psi$ is approximately satisfied. However, in this case, as a beam control range by analog/digital beamforming increases, since a beamforming setting angle satisfying $\sin(\theta)=\sin(\phi)=\sin(\phi)+\sin(\psi)$ has a relationship of $\theta \neq \phi+\psi$, the above assumption is no longer valid.

Accordingly, the present invention provides methods of accurately performing beam control by performing pre-compensation with respect to analog beamforming upon performing digital beamforming. That is, a digital beamforming coefficient may be set based on Equation 16 below.

$$v = \begin{bmatrix} v_1 \\ v_2 \\ \vdots \\ v_{N_{RF}} \end{bmatrix} = \begin{bmatrix} 1 \\ e^{j\pi \cdot N_t^{RF} \cdot 1 \cdot (\sin(\phi) - \sin(\phi+\psi))} \\ \vdots \\ e^{j\pi \cdot N_t^{RF} \cdot (N_{RF}-1) \cdot (\sin(\phi) - \sin(\phi+\psi))} \end{bmatrix} \quad [\text{Equation 16}]$$

$$= \begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1) \cdot \sin(\phi)} e^{-j\pi \cdot N_t^{RF} \cdot (N_{RF}-1) \cdot \sin(\phi+\psi)} \end{bmatrix}$$

$$= \begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \cdot \sin(\phi)} \end{bmatrix} \oplus \begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix}$$

$\oplus$: Hadamard Product

In Equation 16, $$\begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \cdot \sin(\phi)} \end{bmatrix}$$

serves to pre-compensate for the analog beam and $$\begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix}$$

corresponds to a final digital beam.

A method of setting a final direction of a digital beam will now be described. For example, in an environment of $N_t=16$, $N_t^{RF}=4$, $N_{RF}=4$, in order to rotate all beams by $\phi=30°$ through analog beamforming and further rotate the beams by $\psi=5°$ through digital beamforming to set a final beam direction to 35°, a method of designing a digital beamforming coefficient may be defined as shown in Equation 17 below.

$$v = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \oplus \begin{bmatrix} 1 \\ e^{-j\pi \cdot 4 \cdot 1 \cdot \sin(35°)} \\ e^{-j\pi \cdot 4 \cdot 2 \cdot \sin(35°)} \\ e^{-j\pi \cdot 4 \cdot 3 \cdot \sin(35°)} \end{bmatrix} \quad [\text{Equation 17}]$$

-continued $$= \begin{bmatrix} 1 \\ e^{j\pi \cdot 4 \cdot \sin(30°)} \\ e^{j\pi \cdot 8 \cdot \sin(30°)} \\ e^{j\pi \cdot 12 \cdot \sin(30°)} \end{bmatrix} \oplus \begin{bmatrix} 1 \\ e^{-j\pi \cdot 4 \cdot \sin(35°)} \\ e^{-j\pi \cdot 8 \cdot \sin(35°)} \\ e^{-j\pi \cdot 12 \cdot \sin(35°)} \end{bmatrix}$$

A final antenna array response vector obtained by applying the digital coefficient of Equation 16 to Equation 10 may be defined as shown in Equation 18 below.

$$\sum a(\theta) = (1 + \exp(j\pi[\sin(\theta) - \sin(\phi)]) + \quad [\text{Equation 18}]$$
$$\exp(j\pi 2[\sin(\theta) - \sin(\phi)]) +$$
$$\exp(j\pi 3[\sin(\theta) - \sin(\phi)])) \times (v_1 +$$
$$\exp(j\pi 4[\sin(\theta) - \sin(\phi)]) \cdot v_2 +$$
$$\exp(j\pi 8[\sin(\theta) - \sin(\phi)]) \cdot v_3 +$$
$$\exp(j\pi 12[\sin(\theta) - \sin(\phi)]) \cdot v_4)$$
$$= (1 + \exp(j\pi[\sin(\theta) - \sin(\phi)]) +$$
$$\exp(j\pi 2[\sin(\theta) - \sin(\phi)]) +$$
$$\exp(j\pi 3[\sin(\theta) - \sin(\phi)])) \times$$
$$\begin{pmatrix} 1 + \exp(j\pi 4[\sin(\theta) - \sin(\phi) + \\ \sin(\phi) - \sin(\phi+\psi)]) + \\ \exp(j\pi 8[\sin(\theta) - \sin(\phi) + \\ \sin(\phi) - \sin(\phi+\psi)]) + \\ \exp(j\pi 12[\sin(\theta) - \\ \sin(\phi) + \sin(\phi) - \sin(\phi+\psi)]) \end{pmatrix}$$
$$= (1 + \exp(j\pi[\sin(\theta) - \sin(\phi)]) +$$
$$\exp(j\pi 2[\sin(\theta) - \sin(\phi)]) +$$
$$\exp(j\pi 3[\sin(\theta) - \sin(\phi)])) \times$$
$$(1 + \exp(j\pi 4[\sin(\theta) - \sin\phi + (\psi)]) +$$
$$\exp(j\pi 8[\sin(\theta) - \sin(\phi+\psi)]) +$$
$$\exp(j\pi 12[\sin(\theta) - \sin(\phi+\psi)]))$$

In Equation 18, in the case of $\phi=30°$, if a final beamforming rotation angle is set to 35° by applying $\psi=+5°$, Equation 19 is obtained.

$$\sum a(\theta) = (1 + \exp(j\pi[\sin(\theta) - \sin(30°)]) + \quad [\text{Equation 19}]$$
$$\exp(j\pi 2[\sin(\theta) - \sin(30°)]) +$$
$$\exp(j\pi 3[\sin(\theta) - \sin(30°)])) \times$$
$$(1 + \exp(j\pi 4[\sin(\theta) - \sin(35°)]) +$$
$$\exp(j\pi 8[\sin(\theta) - \sin(35°)]) +$$
$$\exp(j\pi 12[\sin(\theta) - \sin(35°)]))$$

Figure 8:
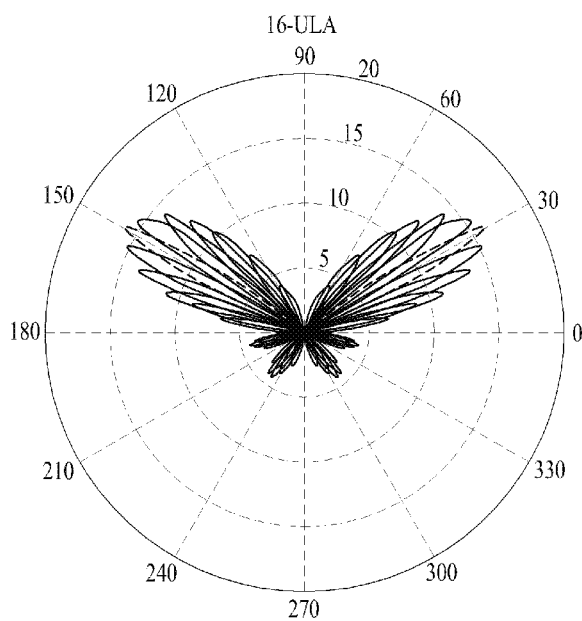
FIG. 8 is a diagram showing an antenna array response, to which digital beamforming coefficient design is applied.

If digital beamforming is performed with respect to $\psi=\pm5°, \pm10°, \pm15°$, the beam shape of the final antenna array response vector shown in FIG. 8 is obtained. FIG. 8 is a diagram showing an antenna array response, to which digital beamforming coefficient design is applied.

Referring to the result shown in FIG. 8, accurate beam control of the hybrid beamformer is possible through such a digital beamforming coefficient design method.

2. Hybrid Beamforming-based Broadcast Channel Transmission Method

Hereinafter, methods of transmitting a broadcast channel (BCH) for hybrid beamforming will be described. BCH transmission is designed in consideration of analog beamforming characteristics of a hybrid beamformer. Accordingly, a method of transmitting a broadcast channel in consideration of restriction on an analog beam basically formed in a hybrid beamformer will be described in detail.

2.1 The same N Broadcast Channels are Transmitted in N Different Subframes by Applying N Different Analog Beamforming Methods.

In an LTE/LTE-A system, an eNB repeatedly transmits broadcast channels in a predetermined period. N different analog beamforming methods corresponding to the repeatedly transmitted N BCHs are applicable and a user equipment may stably receive only a BCH, to which a suitable analog beamforming method is applied according to the position thereof. At this time, by predefining the index of a subframe index in which a BCH is transmitted, the UE may get coarse analog beam information through the index of the subframe in which the BCH is detected.

Accordingly, the UE may transmit feedback information of analog beam information related to the detected BCH to an eNB. The feedback information of the analog beam transmitted by the UE may be an analog beam identifier (ID) and/or the index of a subframe in which the BCH is received.

If N BCHs are repeatedly transmitted, an update period of the BCHs may be set to a multiple of the number N of analog beams.

Figure 9:
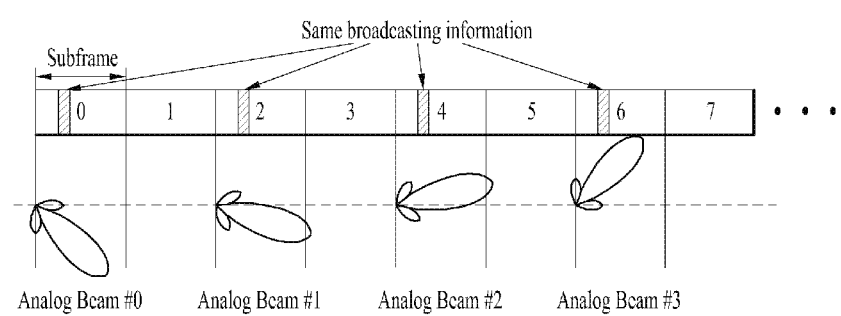
FIG. 9 is a diagram illustrating a BCH being repeatedly transmitted in a predetermined subframe.

FIG. 9 is a diagram illustrating a BCH being repeatedly transmitted in a predetermined subframe.

FIG. 9 shows the case where BCHs are repeatedly transmitted at subframe indices #0, #2, #4 and #6. At this time, the structure of the subframe may be equal to that of the subframe defined in an LTE system. Referring to FIG. 9, it can be seen that the same BCH is transmitted in four subframes and analog beams for transmitting the BCH are different from one another.

That is, the eNB may generate and transmit the same broadcast channel but apply differently defined analog beamforming methods to the predefined subframes #0, #2, #4 and #6 to perform transmission. Accordingly, if the UE detects the BCH in subframe #2, the UE may transmit an analog beam ID (e.g., analog beam #1) or subframe index #2 to the eNB according to the analog beam information feedback period. The eNB may confirm that the analog beam index suitable for the UE is #1 through the feedback information received from the UE.

2.2 Hierarchical Structure of Analog Beam

When an eNB transmits one or more BCHs to a UE, an analog beam may be designed to have a hierarchical structure.

Figure 10:
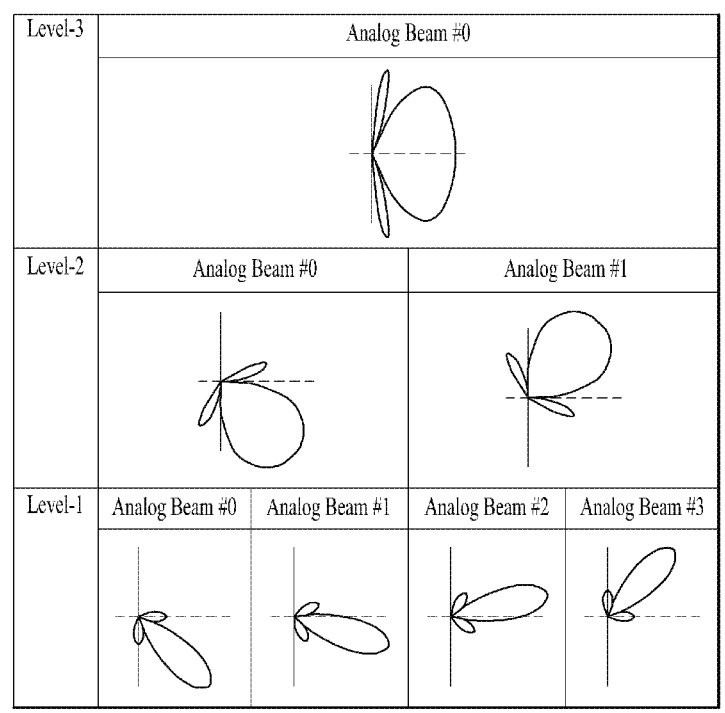
FIG. 10 is a diagram illustrating hierarchical structure of an analog beam for transmitting a BCH.

FIG. 10 is a diagram illustrating hierarchical configuration of an analog beam for transmitting a BCH.

If it is assumed that a maximum of two analog beams are included per level, the analog beam may be configured to have the structure shown in FIG. 10. Referring to FIG. 10, an analog beam of Level 1 is a sharp beam having a beam width of about 15 degrees to 30 degrees. An analog beam of Level 2 has a beam width of about 30 degrees to 60 degrees. At this time, analog beams #0 and #1 of Level 1 correspond to analog beam #0 of Level 2 and analog beams #2 and #3 of Level 1 correspond to analog beam #1 of Level 2. Analog beam #0 of Level 3 has a beam width of about 120 degrees to 180 degrees and is configured to cover analog beams #0 and #1 of Level 2.

On such an assumption, in the embodiment of the present invention, assume that a BCH is always transmitted based on sharpest analog beamforming. It is assumed that, if the UE detects a plurality of BCHs, a suitable analog beam includes all candidate beams. For example, if the UE detects analog beam #0 of Level 1, analog beam #0 of Level 1, analog beam #0 of Level 2 and analog beam #0 of Level 3 become candidate beams.

If the UE may transmit identification information of an analog beam to the eNB upon transmitting feedback information, such that the eNB confirms an analog beam suitable for the UE.

Such an embodiment is equally applicable not only to an analog beam but also to a digital beam.

In another aspect of the present embodiment, if the UE receives one or more BCHs and feeds back two or more pieces of analog beam information, the UE may feed back beam level information and beam index information.

That is, the UE may feed back analog beam information using a feedback structure having the above-described hierarchical structure, upon selecting an analog beam suitable therefor. For example, if the UE derives analog beam indices #0 and #1 through detection of two BCHs, the UE may feed back "Level-2, #0" instead of analog beam indices #0 and #1 of Level-1 shown in FIG. 10. Using the same method, if the UE derives analog beam indices #2 and #3, the UE may feed back only "Level-2, #1" instead of analog beam indices #2 and #3 of Level-1.

As another aspect of this embodiment, if the UE feeds back information on one or more analog beams, the eNB may reconfigure an analog beam suitable for the UE.

The eNB may reconfigure the analog beam suitable for the UE using the feedback information of the BCH received from the UE. For example, if the feedback information is information on one analog beam of "Level-1", the eNB may apply the analog beam without change.

However, if the UE detects two or more BCHs and feeds back the indices of the two or more analog beams, the eNB may generate and apply an analog beam of a higher level which may include lower-level beams. For example, if the UE detects analog beams #0 and #1 and feeds back analog beam indices #0 and #1, the eNB may generate and apply analog beam #0 of Level 2, which may cover the analog beams, to BCH transmission, in order to increase a probability that the BCH is transmitted to the UE in consideration of the location and mobility of the UE. At this time, the UE detects a plurality of BCHs, e.g., two or more BCHs, when signal quality derived upon detecting each BCH is equal to or greater than a predetermined threshold.

As another embodiment of the present invention, the eNB may define a data transmission sector differently from an analog beam transmission region applied to a broadcast channel, upon receiving the indices of two or more analog beams fed back by the UE.

Figure 11:
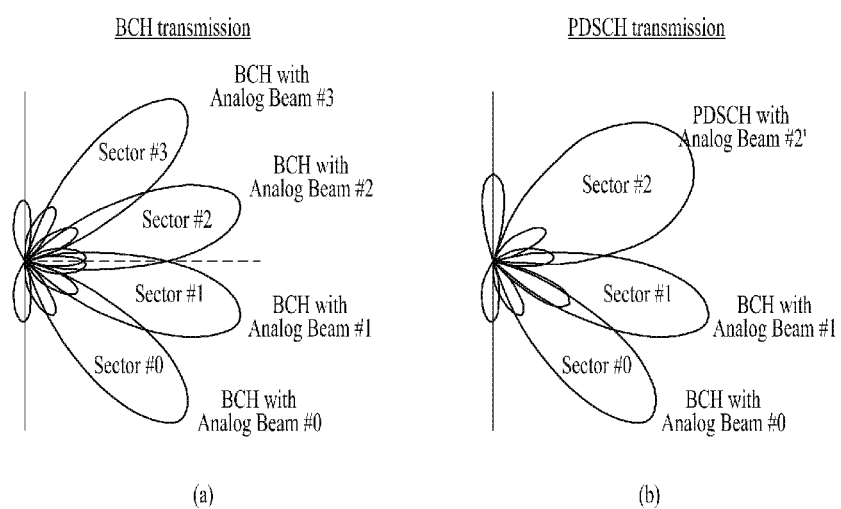
FIG. 11 is a diagram illustrating technology for differently configuring a broadcast channel transmission sector and a data channel transmission sector in consideration of feedback of a UE.

For example, as shown in FIG. 11, if the UE detects and feeds back BCHs with analog beams #2 and #3, the eNB may reconfigure a data channel (e.g., a physical downlink shared channel (PDSCH)) transmission sector without changing sectorization based on the analog beams for BCH transmission.

FIG. 11 is a diagram illustrating technology for differently configuring a broadcast channel transmission sector and a data channel transmission sector in consideration of feedback of a UE. FIG. 11(*a*) shows analog beamforming for BCH transmission and FIG. 11(*b*) shows analog beamforming for PDSCH transmission.

As shown in FIG. 11(b), when the bean width of the analog beam increases for PDSCH transmission, the eNB may transmit multirank data to the UE to increase data throughput and improve diversity gain. However, since the BCH should be reliably transmitted in order to transmit system information, etc. unlike the PDSCH, accurate transmission is necessary rather than throughput increase. Therefore, the configuration shown in FIG. 11(a) is preferable.

2.3 Signal Quality Feedback for BCH

Hereinafter, as an embodiment of the present invention, methods of, at a UE, determining whether each BCH is successfully detected and measuring and reporting signal quality of each BCH in a process of detecting the BCH repeatedly transmitted per subframe will be described.

As a signal quality value measured by the UE, reference signal received power (RSRP) may be generally used. The RSRP value may be used as coarse analog beam gain for calculating a gain difference. Fundamentally, the UE may be configured to perform RSRP estimation only in a subframe in which BCH detection is successful.

Figure 12:
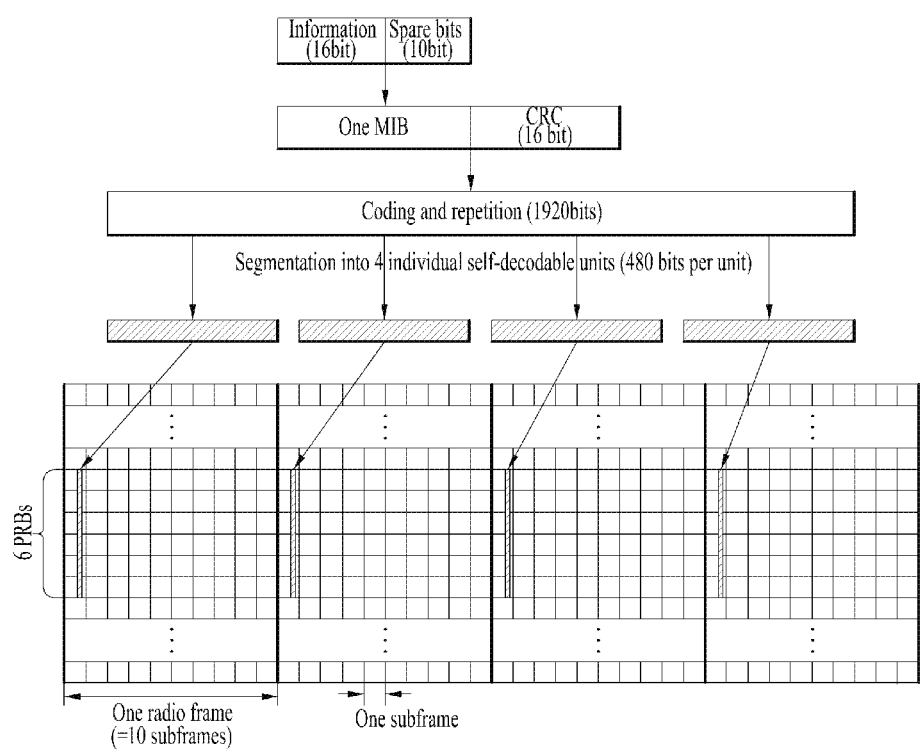
FIG. 12 is a diagram illustrating a method of generating and allocating a physical broadcast channel (PBCH).

FIG. 12 is a diagram illustrating a method of generating and allocating a physical broadcast channel (PBCH).

Referring to FIG. 12, in an LTE/LTE-A system, system information may include one master information block (MIB). One MIB is coded and repeated, is composed of 1920 bits, is divided into four individual self-decodable units, and is transmitted through a physical broadcast channel (PBCH) at an interval of 10 ms. That is, one MIB may be transmitted in units of 40 ms in order to obtain sufficient time diversity. In addition, even when the PBCH is subjected to fading at a specific time, transmission is repeated four times for 40 ms, for stable transmission.

However, in the legacy LTE/LTE-A system, feedback information indicating whether the PBCH is successfully detected and/or RSRP information for the detected PBCH were not fed back. However, in the embodiments of the present invention, unlike PBCH detection of the LTE/LTE-A system, the UE may be configured to estimate the RSRP of the PBCH while determining whether PBCH is detected in each subframe and feed back the information to the eNB. That is, the structure of the legacy PBCH is used without change but operation of the UE is changed.

2.3.1 RSRP Estimation Method of Reference Signal (RS)

The UE may use a channel estimation reference signal defined for PBCH detection to estimate the RSRP of the BCH. For example, the UE may sum the powers of received reference signals (that is, pilot signals) to measure the RSRP. Equation 20 below defines a PBCH estimation method when the number of reference signals (RSs) for PBCH detection is K.

$$RSRP = \frac{1}{K}\sum_{k=1}^{K} P_{rs,k} \quad \text{[Equation 20]}$$

In Equation 20, $P_{rs,k}$ denotes receive power of a k-th RS. If the UE estimates the RSRP using all data tones of the BCH, Equation 20 may be modified to Equation 21 below. At this time, assume that the number of all data tones (that is, resource elements (RE)) is L.

$$RSRP = \frac{1}{L}\sum_{l=1}^{L} P_{re,l} \quad \text{[Equation 21]}$$

In the LTE/LTE-A system, the receive power of a data RE and the receive power of an RS are not summed, because power boosting is performed with respect to the RS to change a power level.

However, in the embodiments of the present invention, since the repeatedly transmitted PBCH is transmitted by applying different analog beamforming per subframe, it is necessary to detect the PBCH per subframe and estimate the RSRP of the PBCH. Accordingly, receive power of the reference signal for PBCHs #0, 1, 2 and 3 repeatedly transmitted four times may be calculated as shown in Equation 22 below, because an analog beamforming coefficient is different per subframe.

Receive power of RE in BCH#0: $P_{re,l} = |H_l F_0^{RF}|^2$

Receive power of RE in BCH#1: $P_{re,l} = |H_l F_1^{RF}|^2$

Receive power of RE in BCH#2: $P_{re,l} = |H_l F_2^{RF}|$ hu 2

Receive power of RE in BCH#3: $P_{re,l} = |H_l F_3^{RF}|^2$ [Equation 22]

2.3.2 Method of Calculating Gain Difference Between Reference Beam and Analog Beam As an embodiment of the present invention, the UE may calculate a gain difference between a reference beam and an analog beam for transmitting each PBCH based on signal quality derived upon detecting a PBCH.

Figure 13:
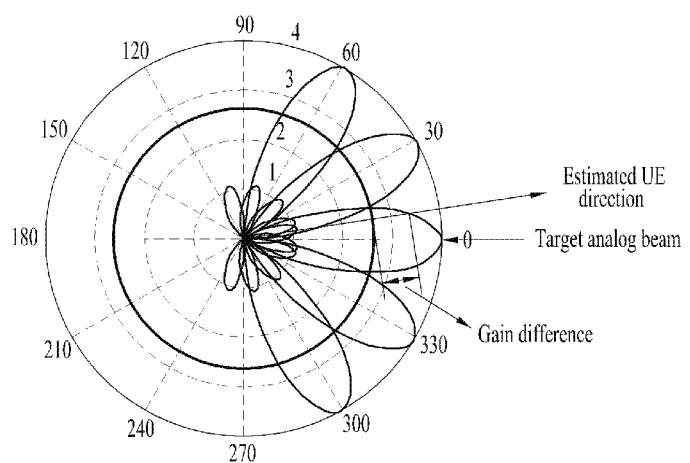
FIG. 13 is a diagram illustrating a method of calculating a gain difference between an analog beam and a reference beam.

In the embodiments, the RSRP measured by the UE may be defined as a beam gain value for the analog beam. The UE may derive the gain difference between the reference beam and a specific target beam using the RSRP as shown in FIG. 13. FIG. 13 is a diagram illustrating a method of calculating a gain difference between an analog beam and a reference beam. In FIG. 13, an outer circle means coverage of the analog beam and an inner circle means coverage of the reference beam.

Equation 23 below shows a method of calculating a gain difference between a reference beam and a target beam.

$$G_{diff} = F_{mea} - G_{ref}(dB) \quad \text{[Equation 23]}$$

In Equation 23, $G_{mea}$ denotes an RSRP value of the analog beam derived by the UE in the BCH detection process and $G_{ref}$ denotes an RSRP value of the reference beam. The UE may feed the beam gain difference $G_{diff}$ derived in Equation 23 back to the eNB, and the eNB may generate and configure a final sharp analog beam to be applied to PBCH transmission or PDSCH transmission to the UE based on the feedback value.

In the embodiment of the present invention, since the reference beam is periodically transmitted by the eNB and should have uniform gain in all directions, the beam shape of an omni-antenna is ideally used.

Although the embodiments of the present invention are all described based on a downlink scenario in which an eNB transmits a signal to a UE, the embodiments of the present invention are applicable to an uplink scenario in which a UE transmits a signal to an eNB using the same method.

In addition, the embodiments of the present invention are applicable to an arbitrary combination of a transmitter and a receiver. For example, the embodiments of the present invention are applicable to an uplink transmission scenario in which a UE transmits a signal to an eNB, a UE-to-UE signal transmission scenario (D2D, V2V, etc.) or an eNB-to-eNB signal transmission scenario (relay, wireless backhaul, etc.).

In addition, although an analog beamforming-based system is described in the embodiments of the present invention, the technology of the present invention is applicable to a digital beamforming-based system in order to perform dynamic sectorization according to the location of a UE or distribution of a UE group. At this time, the PBCH may be precoded or beamformed by digital beamforming instead of analog beamforming and the UE may measure and report information on a digital beam instead of an analog beam for each BCH.

2.4 Hybrid Beamforming-based Broadcast Channel Transmission Method

Figure 14:
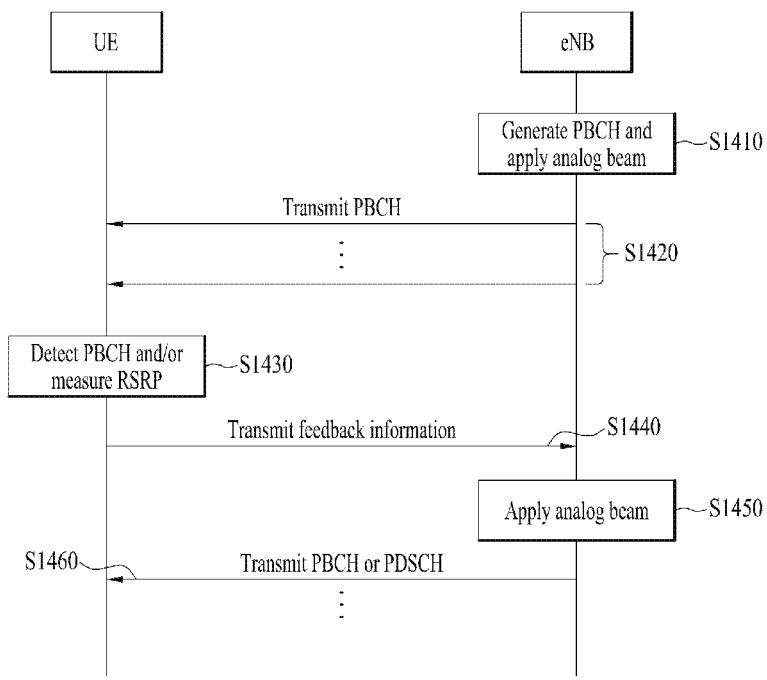
FIG. 14 is a diagram illustrating a method of transmitting a hybrid beamforming-based broadcast channel.

FIG. 14 is a diagram illustrating a method of transmitting a hybrid beamforming-based broadcast channel.

Hereinafter, the method of transmitting the hybrid beamforming-based broadcast channel will be described with reference to FIG. 14 from the viewpoint of signaling of a UE and an eNB.

The eNB may apply the analog signal described with reference to FIGS. 1 to 13 for PBCH transmission. That is, the eNB may generate a PBCH to be transmitted to the UE and apply an analog beam thereto (S1410).

The eNB may repeatedly transmit the same PBCH N times (e.g., four times) and apply different analog beams to different subframes (S1420).

The UE may detect the PBCH transmitted in step S1420. At this time, the UE may acquire analog beam index information and/or subframe information of some or all of the detected PBCHs. For example, if the UE detects the PBCHs in subframes #1 and #2, the UE may feed back the subframe indices or the analog beams transmitted in subframes. In addition, the UE may measure and feed back the RSRPs of the detected PBCHs (S1430 and S1440).

For the method of feeding back the detected PBCHs in steps S1430 and S1440, refer to Chapters 2.1 and 2.2 and, for the method of measuring the RSRPs, refer to Chapter 2.3.

The eNB may apply an adjusted analog beam to the PBCH or PDSCH to be transmitted to the UE based on the received feedback information (S1450 and S1460).

3. Apparatus

Figure 15:
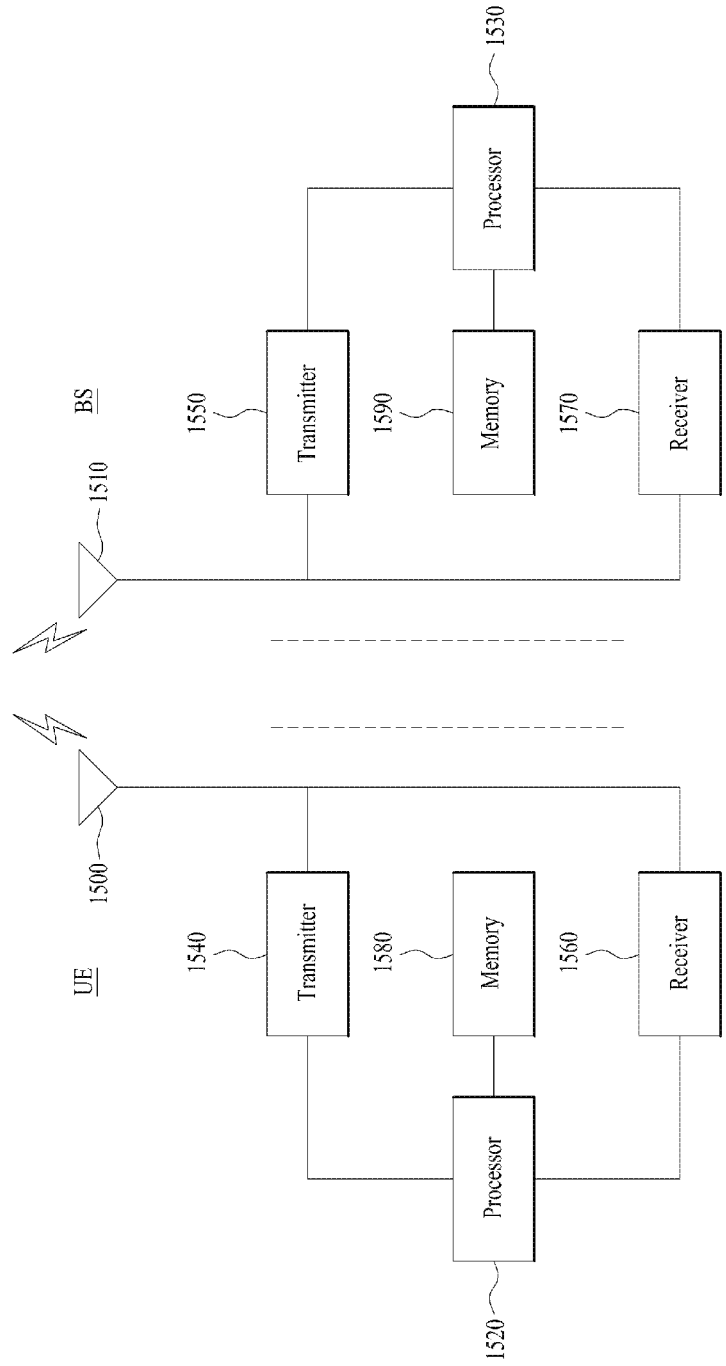
FIG. 15 is a diagram showing an apparatus for implementing the methods described with reference to FIGS. 1 to 14.

Apparatuses illustrated in FIG. 15 are means that can implement the methods described before with reference to FIGS. 1 to 14.

A UE may act as a transmission end on a UL and as a reception end on a DL. An eNB may act as a reception end on a UL and as a transmission end on a DL.

That is, each of the UE and the eNB may include a transmitter 1540 or 1550 and a receiver 1560 or 1570, for controlling transmission and reception of information, data, and/or messages, and an antenna 1500 or 1510 for transmitting and receiving information, data, and/or messages.

Each of the UE and the eNB may further include a processor 1520 or 1530 for implementing the afore-described embodiments of the present disclosure and a memory 1580 or 1590 for temporarily or permanently storing operations of the processor 1520 or 1530.

The embodiments of the present invention may be implemented using the components and functions of the UE and the eNB. In addition, each of the processors of the UE and the eNB may include an analog beamformer supporting analog beamforming and a digital beamformer supporting digital beamforming. Accordingly, the processor of the UE or the eNB may combine the methods described in Chapters 1 to 2 to apply a hybrid beamforming method for supporting multi-rank. For a detailed description thereof, refer to Chapters 1 and 2.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1580 or 1590 and executed by the processor 1520 or 1530. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for transmitting a broadcast channel in a radio access system supporting hybrid beamforming, the method comprising:

transmitting N broadcast channels including same broadcast information in N different subframes; and receiving feedback information for one or more of the N broadcast channels, wherein the feedback information includes one or more indices of subframes in which the broadcast channels are transmitted, wherein the N broadcast channels are transmitted based on N different analog beams, and N is a positive integer, wherein the N analog beams are configured in a hierarchical structure in which coverage of beams having a smaller width is included in coverage of a beam having a larger width, wherein the feedback information further includes information on reference signal receive power (RSRP) of the broadcast channels, and wherein the feedback information further includes information on a gain difference between a reference signal receive power (RSRP) of a reference beam and a RSRP of the analog beam.

2. An apparatus for transmitting a broadcast channel in a radio access system supporting hybrid beamforming, the apparatus comprising:

a transmitter;
a receiver; and
a processor configured to control the transmitter and the receiver to support transmission of the broadcast channel, wherein the processor is configured to:

control the transmitter to transmit N broadcast channels including same broadcast information in N different subframes; and control the receiver to receive feedback information for one or more of the N broadcast channels, wherein the feedback information includes one or more indices of subframes in which the broadcast channels are transmitted, wherein the N broadcast channels are transmitted based on N different analog beams, and N is a positive integer, wherein the N analog beams are configured in a hierarchical structure in which coverage of beams having a smaller width is included in coverage of a beam having a larger width, wherein the feedback information further includes information on reference signal receive power (RSRP) of the broadcast channels, and wherein the feedback information further includes information on a gain difference between a reference signal receive power (RSRP) of a reference beam and a RSRP of the analog beam.

3. The method of claim 1, wherein the N broadcast channels are transmitted simultaneously.

4. The apparatus of claim 2, wherein the N broadcast channels are transmitted simultaneously.

* * * * *